May 4, 1948.     G. A. SHARPE     2,440,701
BODY BLANK ALIGNING DEVICE
Filed Feb. 12, 1945
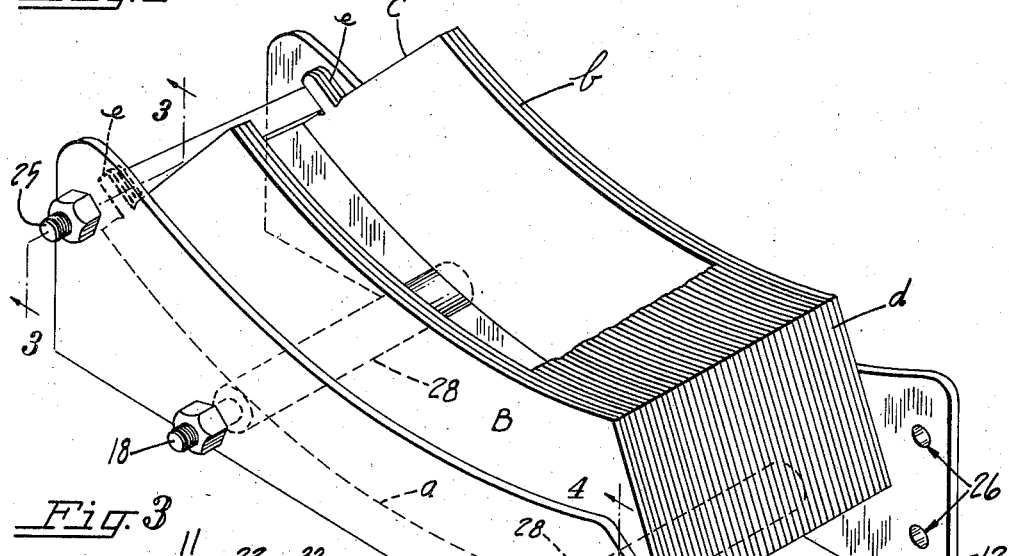
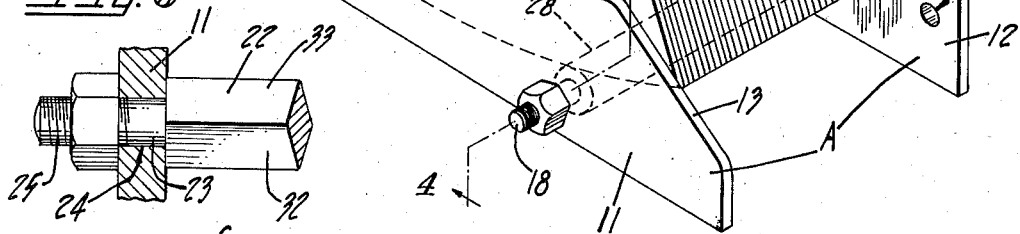
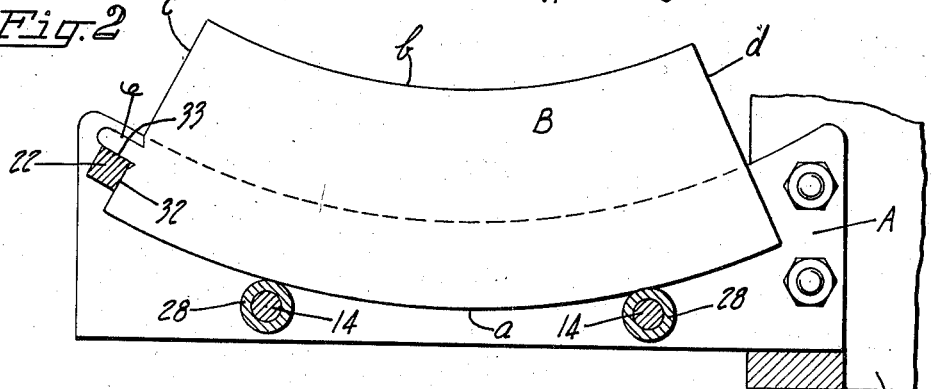
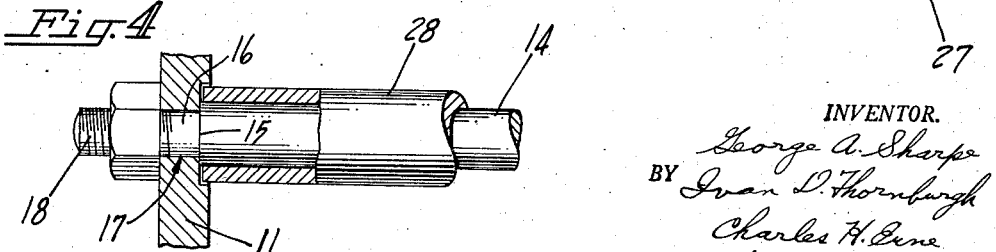
INVENTOR.
George A. Sharpe
BY Ivan D. Thornburgh
Charles H. Bene
ATTORNEYS Patented May 4, 1948

2,440,701

UNITED STATES PATENT OFFICE 2,440,701

BODY BLANK ALIGNING DEVICE

George A. Sharpe, Fairport, N. Y., assignor to American Can Company, New York, N. Y., a corporation of New Jersey Application February 12, 1945, Serial No. 577,423

5 Claims. (Cl. 271—61)

This invention relates to devices for aligning can body blanks and the like and has particular reference to a squaring block gauge for the alignment of tapered can body blanks having oppositely disposed curved and straight edges.

An object of the invention is the provision of a squaring block gauge for aligning tapered can body blanks having curved and straight edges so that exact duplication of outline of the blanks and also corresponding positions of the blanks may be observed and incorrect outlines or incorrectly placed blanks will be detected.

Another object of the invention is the provision of a squaring block gauge for tapered can body blanks having curved and straight edges and extending tongues wherein a transverse tongue bar used for correctly positioning one of the straight edges of the blank also functions for simultaneously positioning the tongue to square up and align all of the blanks to detect any irregularity in blank outline or position.

Numerous other objects and advantages of the invention will be apparent as it is better understood from the following description, which, taken in connection with the accompanying drawings, discloses a preferred embodiment thereof.

Referring to the drawing:

Figure 1 is a perspective view illustrating a squaring block gauge for aligning can body blanks embodying the present invention and showing a plurality of blanks in aligned position;

Fig. 2 is a longitudinal sectional view of the gauge shown in Fig. 1; and

Figs. 3 and 4 are sectional details taken substantially along the broken lines 3—3 and 4—4 in Fig. 1.

As a preferred embodiment of the instant invention the drawings illustrate a squaring block gauge A for aligning a plurality of can body blanks B. Such a gauge is helpful in arranging a supply of body blanks as an incident to stacking them for easy insertion into the magazine of a body maker or other can making machine. The squaring block gauge A is also a checking device for testing edge alignment of can body blanks particularly of irregular outline, as blanks for use in making tapered cans.

The body blank B (Fig. 2) may be used in the manufacture of tapered tearing strip cans and has two opposing curved edges $a$, $b$ and two opposing straight edges $c$, $d$. The latter edges are cut at an angle with respect to each other as viewed in said figure. The straight edge $c$ has a tongue $e$ extending outwardly therefrom. Such a tongue is provided for opening a tapered tearing strip can made from the body blank and is of conventional form.

The guage A is designed to hold in vertical position a supply of the blanks B so that they can be aligned accurately and rapidly. A two-point contact thus is provided to initially support the curved edge $a$ of each blank. From this initially supported position the blank B is shifted endwise (as to the left, Fig. 2) to bring its straight edge C into a guaged position. Subsequent blanks then are inserted and brought into gauged position. In gauged position all of the blank edges $a$, $b$, $c$ and $d$ as well as the edges of the tongue $e$ are flush and in alignment.

The gauge A comprises a front plate 11 and a back plate 12. These plates extend longitudinally in separated relationship and are adapted to receive and hold a supply of body blanks therebetween. The plates 11, 12 are substantially rectangular in shape having a curved upper edge. The upper right hand edge of the front plate 11 (as viewed in Fig. 1) may be cut away as at 13, at substantially 45 degrees to facilitate aligning of body blanks.

Plates 11, 12 are held in separated position by a plurality of transverse spacing members or rods 14. Rods 14 preferably are shouldered as at 15 (Fig. 4), each rod having a stem 16 at each end. Each plate has a plurality of holes 17 in which the rod stems are received. The end of each stem 16 is threaded as at 18 for a nut which locks the plate against the rod shoulder 15 thereby rigidly holding all of these parts as a unit.

The plates 11, 12 also are held together by a cross member or tongue bar 22. This bar like the rod 14 is shouldered and has an integral stem 23 at each end for entrance in a drilled hole 24 formed in each plate (Fig. 3). The terminal ends of these stems also are threaded as at 25 for receiving nuts which secure the bar 22 between the plates. This bar serves as a stop for locating the edge $c$ of each blank and also its tongue $e$ into gauged position. This aligns the straight edges $c$ and the tongues of the blanks.

The back plate 12 is provided with two spaced drill holes 26 at the right, as viewed in Fig. 1. These are for anchoring bolts to secure the device A onto a suitable machine main frame 27 as for example, a can making machine (see also Fig. 2).

Ease of shifting of the blanks B endwise after initial insertion is provided for by rollers 28 loosely mounted on rods 14. To more accurately align the tongues $e$ of the blanks B as well as the straight edges C, the tongue bar 22 is formed preferably with a rectangular cross section. Thus the bar has adjoining faces 32, 33 which are set at the desired angle as shown. Such a shape and position is proper for gauging tapered can body blanks having tongues.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a squaring block gauge for aligning tapered can body blanks having curved and straight edges, the combination of oppositely disposed spaced plates for receiving therebetween the blanks to be squared, spacing members disposed between and secured at their opposite ends to said plates for maintaining the plates in separated relation and for aligning one curved edge of each blank, and a cross member located between and secured at its opposite ends to the plates adjacent one end of the latter for aligning a blank straight edge to indicate any irregularity of the said blank edges.

2. In a squaring block gauge for aligning tapered can body blanks having curved and straight edges, the combination of vertically disposed plates for receiving the blanks to be squared, spacing rods disposed between said plates for separating the same, rollers rotatably mounted on said rods for supporting the blanks with one curved edge resting thereon, and a cross member located between the plates near one end thereof, said member being engaged by a straight edge of each blank as it is moved over said rollers to square adjacent blanks to indicate any irregularity of the blank edges.

3. In a squaring block gauge for aligning tapered can body blanks having oppositely disposed curved and straight edges and a tongue extending from one of said straight edges, the combination of plates for receiving the blanks to be squared, a plurality of transverse rods disposed between said plates for supporting the blanks and for aligning a curved edge of each blank with the corresponding edge of an adjacent blank, and a tongue bar located near an end of and between said plates for aligning the straight edges and the tongues of adjacent blanks.

4. In a squaring block gauge for aligning tapered can body blanks having oppositely disposed curved and straight edges and a tongue extending from one of said straight edges, the combination of plates for receiving the blanks therebetween, the blanks being in a vertical position and resting on a curved blank edge, a plurality of transverse shouldered rods disposed between and secured to said plates to keep the latter separated and to align corresponding curved edges of the blanks, and a tongue bar located near an end of and between the said plates for aligning corresponding straight edges and corresponding tongue edges of the blanks.

5. In a squaring block gauge for aligning tapered can body blanks having oppositely disposed curved and straight edges and a tongue extending from one of said straight edges, the combination of plates for receiving the blanks therebetween, a pair of transverse spaced rods disposed between and secured to the plates to keep them in position, a roller carried on each rod for and providing an aligning support for one of the curved edges of each blank, and a tongue bar located near an end of and between the said plates, said bar being rectangular in cross section for engagement with and for alignment of corresponding straight edges of the blanks and for engagement with and for alignment of corresponding edges of the blank tongues.

GEORGE A. SHARPE.

REFERENCES CITED

The following references are of record in the file of this patent:

UNITED STATES PATENTS

| Number | Name | Date |
|---|---|---|
| 142,606 | Allen | Sept. 9, 1873 |
| 1,086,701 | Claussen | Feb. 10, 1914 |
| 1,326,334 | Gaffney | Dec. 30, 1919 |
| 1,407,565 | Novick | Feb. 21, 1922 |
| 1,699,284 | English et al. | Jan. 15, 1929 |
| 2,038,645 | Cherry et al. | Apr. 28, 1936 |
| 2,073,832 | Dalkowitz | Mar. 16, 1937 |
| 2,304,172 | Heywood et al. | Dec. 8, 1942 |
| 2,365,211 | Novick | Dec. 19, 1944 |

FOREIGN PATENTS

| Number | Country | Date |
|---|---|---|
| 351,303 | Great Britain | June 25, 1931 |